(12) United States Patent
Stegt et al.

(10) Patent No.: US 8,883,934 B2
(45) Date of Patent: Nov. 11, 2014

(54) METHOD FOR MAKING LOW DENSITY POLYURETHANE FOAM FOR SOUND AND VIBRATION ABSORPTION

(75) Inventors: Helmut Stegt, Ahlen (DE); Allan James, Oxford, MI (US); Stephen R. Burks, Essexville, MI (US); Jason A. Reese, Auburn, MI (US); David J. Honkomp, Canton, GA (US)

(73) Assignee: Dow Global Technologies LLC, Midland, MI (US)

( * ) Notice: Subject to any disclaimer, the term of this patent is extended or adjusted under 35 U.S.C. 154(b) by 333 days.

(21) Appl. No.: 13/514,180

(22) PCT Filed: Dec. 7, 2010

(86) PCT No.: PCT/US2010/059162
§ 371 (c)(1),
(2), (4) Date: Jun. 6, 2012

(87) PCT Pub. No.: WO2011/081793
PCT Pub. Date: Jul. 7, 2011

(65) Prior Publication Data
US 2012/0259029 A1    Oct. 11, 2012

Related U.S. Application Data

(60) Provisional application No. 61/290,604, filed on Dec. 29, 2009.

(51) Int. Cl.
| | | |
|---|---|---|
| C08K 3/00 | (2006.01) | |
| C08J 9/228 | (2006.01) | |
| C08G 18/48 | (2006.01) | |
| C08G 65/26 | (2006.01) | |
| C08G 101/00 | (2006.01) | |

(52) U.S. Cl.
CPC ........ *C08G 65/2609* (2013.01); *C08G 2650/24* (2013.01); *C08G 18/4812* (2013.01); *C08G 2101/0008* (2013.01)
USPC .......................................................... 525/460

(58) Field of Classification Search
CPC .......... C08G 18/4816; C08G 18/4812; C08G 65/2609
USPC .......................................................... 525/460
See application file for complete search history.

(56) References Cited

U.S. PATENT DOCUMENTS

| | | | |
|---|---|---|---|
| 3,153,002 A | | 10/1964 | Wismer |
| 4,143,004 A | | 3/1979 | Stromblad |
| 4,385,133 A | * | 5/1983 | Alberino et al. .............. 521/159 |
| 4,451,588 A | * | 5/1984 | Speranza et al. .............. 521/175 |
| 5,648,559 A | | 7/1997 | Hager |
| 6,034,197 A | * | 3/2000 | Mahon et al. ................. 521/174 |
| 6,312,513 B1 | * | 11/2001 | Hoefer et al. ................. 106/499 |
| 6,590,008 B1 | | 7/2003 | Parfondry |
| 2004/0024077 A1 | * | 2/2004 | Braun et al. .................. 521/155 |
| 2007/0213420 A1 | * | 9/2007 | Kimura et al. .................. 521/99 |
| 2008/0090921 A1 | * | 4/2008 | Hayes et al. .................. 521/122 |
| 2008/0114088 A1 | * | 5/2008 | Sasaki et al. .................. 521/174 |

FOREIGN PATENT DOCUMENTS

| | | |
|---|---|---|
| EP | 132302 A | 1/1985 |
| WO | WO 2007099995 A1 * | 9/2007 |
| WO | WO 2008105843 A1 * | 9/2008 |

\* cited by examiner

*Primary Examiner* — Mike M Dollinger
(74) *Attorney, Agent, or Firm* — Gary C Cohn PLLC

(57) ABSTRACT

Flexible polyurethane foams that function well in noise and vibration absorption applications are made from a mixture of polyether polyols oxides that each has a hydroxyl equivalent weight of from 1200 to 3000 and at least 70% primary hydroxyl groups. From 5 to 80% by weight of the ethylene oxide-capped polypropylene oxides are nominally difunctional, from 0.5 to 20% by weight of the ethylene oxide-capped polypropylene oxides have a nominal functionality of four or higher, and the balance of the ethylene oxide-capped polypropylene oxides, but not less than 1.5% by weight thereof, are nominally trifunctional.

3 Claims, No Drawings

METHOD FOR MAKING LOW DENSITY POLYURETHANE FOAM FOR SOUND AND VIBRATION ABSORPTION

This application claims priority from U.S. Provisional Patent Application No. 61/290,604, filed 29 Dec. 2009.

The present invention relates to methods for making low density sound and vibration-absorbing polyurethane foam.

Noise and vibration management is a significant issue for vehicle manufacturers, as cabin noise is a major factor in the comfort experience of automotive passengers. Therefore, noise and vibration abatement measures are routinely incorporated into motor vehicles. These abatement measures are often polyurethane foams, which may also be called upon to perform some functional purpose such as seating, for example, or some aesthetic purpose. Seating may provide as much as 50% of the sound absorption in a vehicle and trim parts such as headliners and instrument panels absorb still more of the sound. These functional parts must have physical and other performance properties as required for their specific uses. Therefore, in most cases noise and vibration absorption cannot come at the expense of the physical properties of the foam.

Cost is of course another consideration as manufacturers are always trying to reduce their production costs. One way to do with this with foam products is to reduce their density, so smaller amounts of raw materials are needed to prepare a part with a given volume. Some manufacturers now desire to reduce the foam density of these products by about 10%, from the range of about 44-50 kg/m$^3$ down to about 36-42 kg/m$^3$.

The simplest and most economical approach to accomplish this is to increase the amount of water in the formulation. Water reacts with isocyanate groups to release carbon dioxide, which forms the blowing gas. By increasing the amount of water in the formulation, more carbon dioxide can be formed, provided that there are enough isocyanate groups to react with the additional water.

The reaction between water and isocyanate groups also extends the growing polymer chains by creating urea linkages between polyisocyanate molecules. The water-polyisocyanate reaction by itself forms a very rigid and brittle polymer. To overcome this brittleness and produce a flexible and resilient material, high equivalent weight polyols are added to the foam formulation. Hydroxyl groups on the polyols react with isocyanate groups to form urethane linkages. The urethane-forming reaction that takes place between the polyol and the isocyanate groups therefore is in competition with the water-isocyanate reaction. These reactions must be balanced so the construction of high molecular weight polymer chains and the generation of carbon dioxide proceed in the proper sequence. As the amount of water is increased, relative to the amount of polyols, the balance between these reactions becomes difficult to remain. High water systems tend to become sensitive to small variations in processing conditions, such as, for example, small variations in the amount of catalysts or component or mold temperatures. It therefore becomes increasingly difficult to produce good quality foam consistently, in a manufacturing setting, with these high water formulations. The foams tend to have large voids, and areas of incomplete mold filling, especially at the end of the shot. In addition, there is often a large variation in foam quality from part to part, which again indicates the instability of the processing. At higher densities, these problems can be overcome to some extent by overpacking the mold (i.e., injecting more of the foam formulation than is needed to barely fill the mold). But as the foam density is reduced, little or no overpacking can take place as the molded foam density more closely approaches the so-called minimum fill density of the foam formulation.

It would be desirable to provide a composition for producing resilient, flexible polyurethane foam in a high water process, which provides foams which have a low density (up to 42 kg/m$^3$) and good sound absorption properties, and which processes easily.

This invention is an one aspect a mixture of ethylene oxide-capped polypropylene oxides each having a hydroxyl equivalent weight of from 1200 to 3000 and containing at least 70% primary hydroxyl groups, wherein from 5 to 80% by weight of the ethylene oxide-capped polypropylene oxides are nominally difunctional, from 0.5 to 20% by weight of the ethylene oxide-capped polypropylene oxides have a nominal functionality of four or higher, and the balance of the ethylene oxide-capped polypropylene oxides, but not less than 1.5% by weight thereof, are nominally trifunctional.

The invention is also a process for preparing a polyurethane, comprising blending the mixture of ethylene oxide-capped polypropylene oxides of the first aspect with a polyisocyanate and subjecting the resulting blend to conditions sufficient to cure the blend to form a resilient, flexible polyurethane foam.

The polyol mixture of the invention is particularly suitable for preparing resilient, flexible polyurethane foams in high water formulations. Therefore, the invention is also a process for preparing a resilient, flexible polyurethane foam comprising blending the mixture of ethylene oxide-capped polypropylene oxides of the first aspect with a polyisocyanate in the presence of from 4 to 7 parts by weight of water per 100 parts by weight of the ethylene oxide-capped polypropylene oxides and subjecting the resulting blend to conditions sufficient to cure the blend to form a resilient, flexible polyurethane foam.

It has been found that foam formulations that include the polyol mixture of the invention tend to process easily, even in high water formulations which produce foams of 42 kg/m$^3$ density or less. The reason for this is not understood, and is unexpected. The phenomenon does not appear to be related directly to the average functionality of the polyol mixture, as this can vary quite substantially, from as low as about 2.3 to well over 3.0, with good results, provided that all three polyol types are present. The phenomenon may be related to a slightly slower reaction rate that has been observed when the polyol mixture is used to prepare certain flexible foams. This, too, is quite surprising, as the reactivities of the individual polyols are such that the mixture would not be expected to react more slowly than mixtures of only the diol and the triol components. Nonetheless, foam formulations containing the polyol mixture can consistently produce good quality parts, even at densities in the range of from 36 to 42 kg/m$^3$, and even when there is little overpacking of the mold.

In addition, the foams perform well in noise and vibration absorption applications.

The polyol mixture contains at least three different ethylene oxide-capped polypropylene oxides. Each of them has a hydroxyl equivalent weight of at least 1200, preferably at least 1500, more preferably at least 1700, up to 3000, preferably up to 2500 and more preferably up to 2200. The constituent polyols in the mixture preferably each have hydroxyl equivalent weights that are within 300 of each other. Each of them has at least 70% primary hydroxyl groups, preferably at least 75% primary hydroxyl groups, the rest being secondary hydroxyl. The proportion of primary hydroxyl groups may be up to 100%, or up to 90%. The ethylene oxide-caps are blocks of polymerized oxyethylene which may constitute from 5 to 30% by weight of the polyol in each case.

From 5 to 80% of the weight of the ethylene oxide-capped polypropylene oxides are nominally difunctional. By "nominally" difunctional, it is meant that the polyol is prepared from a difunctional starter compound. It is well known that polypropylene oxide forms some amount of monofunctional impurities when it is polymerized, particularly when polymerized in an anionic polymerization process under strongly basic conditions. As a result, the actual average functionalities of poly(propylene oxide)s tend to be somewhat lower than the nominal functionalities. For purposes of this invention, functionalities are all nominal functionalities, meaning that the functionality of a polyol is considered to be the same as that as its starter compound.

The difunctional ethylene oxide-capped polypropylene oxide preferably constitutes from 5 to 25% of the total weight of the ethylene oxide-capped polypropylene oxides, and still more preferably from 5 to 15% by weight thereof.

From 0.5 to 20%, preferably from 1 to 15% and still more preferably from 1 to 5% of the weight of the ethylene oxide-capped polypropylene oxides have nominal functionalities of four or more. The functionally of these components may be 8 or even higher, with preferred functionalities being from six to eight.

The balance of the ethylene oxide-capped polypropylene oxide polyols are nominally trifunctional. The trifunctional polyol should constitute at least 1.5% of the mixture, and preferably constitutes from 10 to 94.5%, more preferably from 80 to 94.5% thereof by weight.

The polyol mixture can be prepared by separately manufacturing the constituent polyols and blending them together. It is also possible to produce the mixture (or subcombinations of the constituent polyols) by alkoxylating a mixture of initiator compounds. Such a mixture of starter compounds may be a mixture of a difunctional starter and a trifunctional starter; a mixture of a difunctional starter with a starter having a functionality of four or more; a mixture of a trifunctional starter and a starter having a functionality of four or more; or a mixture of a difunctional starter, a trifunctional starter and a starter having a functionality of four or more. High (4+) functionality starters in particular often are mixed with di- or trifunctional starters, in order to facilitate the polymerization process.

The resulting mixture of ethylene oxide-capped polypropylene oxides is useful for preparing a variety of polyurethane polymers, through reaction with one more organic polyisocyanates. "Polyurethane" polymers is used herein as a shorthand term to denote polymers that have urethane groups, and optionally other groups such as urea groups. The particular manufacturing process used to prepare the polyurethane is not considered to be critical to the invention. Therefore, a variety of molding, casting, bulk polymerization, dispersion or solution polymerization and like methods can be used. Similarly, a wide range of polyurethane products can be prepared, including non-cellular elastomers, microcellular elastomers, structural foams, rigid insulating foams, viscoelastic foams, flexible foams (both molded or slabstock types), reinforced polymers of various types, and the like. Foaming processes such as slabstock foam manufacturing processes and, especially, molded foam manufacturing processes are processes of particular interest. Resilient, flexible polyurethane foams are of most interest.

The organic polyisocyanate which reacts with the polyol mixture to make the polyurethane may be an aromatic, cycloaliphatic, or aliphatic isocyanate. Aromatic polyisocyanates are preferred and, among these, diphenylmethane diisocyanate (MDI) and/or a polymeric MDI (PMDI) are preferred on the basis of generally greater reactivity, availability and cost. MDI may be the 2,4'-isomer, the 4,4'-isomer, or some mixture thereof. PMDI is generally a mixture of one or polymethylene polyphenylisocyanates and some MDI; the MDI portion of the mixture may be either or both of the 2,4- and the 4,4'-isomers. The polyisocyanate is generally used in an amount sufficient to provide an isocyanate index of from about 0.6 to 1.5, preferably from 0.7 to 1.2 and still more preferably from 0.7 to 0.9, although values outside of these ranges may be useful in specific situations. The isocyanate index is equal to the ratio of equivalents of isocyanate-reactive groups to isocyanate groups in a reaction mixture that is used to produce a polyurethane.

The reaction between the polyol mixture and the organic polyisocyanate can be performed in the presence of various types of other materials, as may be useful in the particular manufacturing process that is used or to impart desired characteristics to the resulting polymer. These include, for example, catalysts, blowing agents, cell openers, surfactants, crosslinkers, chain extenders, fillers, colorants, fire retardants, pigments, antistatic agents, reinforcing fibers, antioxidants, preservatives, acid scavengers, and the like.

The polyol mixture of the invention is useful in making resilient flexible polyurethane foam. It offers particular advantages in high water formulations that contain from 4 to 7 parts, especially from 4.5 to 6 parts by weight of water per 100 parts by weight of the ethylene oxide-capped polypropylene oxides. Polyurethane foams are made from these high water formulations by reacting the polyol mixture with an organic polyisocyanate in the presence of the water. The foam can be made in a slabstock (free-rise) process or in a closed mold. Molding processes are preferred to make products such as automotive seating, dash boards, instrument panels, and other automotive interior trim parts.

Various other components can be present in a foam formulation for making resilient, flexible foam, in addition to the aforementioned polyisocyanate, polyol and water.

At least one catalyst normally will be present in the foam formulation. One preferred type of catalyst is a tertiary amine catalyst. The tertiary amine catalyst may be any compound possessing catalytic activity for the reaction between a polyol and a polyisocyanate and at least one tertiary amine group. Representative tertiary amine catalysts include trimethylamine, triethylamine, dimethylethanolamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) amino-ethoxy ethanol, N,N,N', N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine) ethyl) ether, tris(dimethylamino propyl) amine, dicyclohexyl methyl amine, bis(N,N-dimethyl-3-aminopropyl) amine, 1,2-ethylene piperidine and methyl-hydroxyethyl piperazine Low (up to 200) hydroxyl equivalent weight polyols that are amine-initiated are also useful catalysts. These include polyols initiated with bis(3-aminopropyl)methylamine.

The foam formulation may contain one or more other catalysts, in addition to or instead of the tertiary amine catalyst mentioned before. Of particular interest among these are tin carboxylates and tetravalent tin compounds. Examples of these include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5, preferably from 0.01 to 1 part by weight per 100 parts by weight of the ethylene oxide-capped polyols. Tin catalysts are typically used in amounts towards the low end of these ranges.

The foamable composition may contain a crosslinker, which preferably is used, if at all, in small amounts, to 2 parts, up to 0.75 parts, or up to 0.5 parts by weight per 100 parts by weight of the ethylene oxide-capped polyols). The crosslinker contains at least three isocyanate-reactive groups per molecule and has an equivalent weight, per isocyanate reactive group, of from 30 to about 125 and preferably from 30 to 75. Aminoalcohols such as monoethanolamine, diethanolamine and triethanolamine are preferred types, although compounds such as glycerine, trimethylolpropane and pentaerythritol also can be used.

A surfactant is preferably included in the foam formulation to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as Tegostab (trademark of Goldschmidt Chemical Corp.) B-8729, and B-8719LF, and Niax™ L2171 surfactant from OSi Specialties. Non-hydrolyzable liquid organosilicones are more preferred. When a surfactant is used, it is typically present in an amount of 0.0015 to 1 part by weight per 100 parts by weight of the ethylene oxide-capped polyols.

A cell opener preferably is present in the foam formulation. The cell opener functions during the polymerization reaction to break cell walls and therefore promote the formation of an open cell structure. A high open cell content (at least 25% by number, preferably at least 50%) is usually beneficial for foams that are used in noise and vibration absorption applications. A useful type of cell opener includes ethylene oxide homopolymers or random copolymers of ethylene oxide and a minor proportion of propylene oxide, which have a molecular weight of 5000 or more. These cell openers preferably have a hydroxyl functionality of at least 4, more preferably at least 6. Cell openers are preferably used in amounts from about 0.5 to about 5 parts by weight per 100 parts by weight of the mixture of the ethylene oxide-capped polyols.

Other than the cell opener, and the mixture of ethylene oxide-capped polypropylene oxides, the foam formulation preferably contains no more than 10 parts and more preferably no more than 2 parts by weight, per 100 parts by weight of the ethylene oxide-capped polyols, of any polyol having an equivalent weight of 500 or greater. It is most preferred that no other polyols having an equivalent weight of 500 or greater are present in the foam formulation.

A chain extender, by which it is meant a compound having exactly two isocyanate-reactive groups and an equivalent weight per isocyanate-reactive group of up to 499, preferably up to 250, also may be present. Chain extenders, if present at all, are usually used in small amounts, such as up to 10, preferably up to 5 and more preferably up to 2 parts by weight per 100 parts by weight of the mixture of ethylene oxide-capped polypropylene oxides. Examples of suitable chain extenders include ethylene glycol, diethylene glycol, triethylene glycol, propylene glycol, dipropylene glycol, tripropylene glycol, 1,4-dimethylolcyclohexane, 1,4-butane diol, 1,6-hexane diol, 1,3-propane diol, diethyltoluene diamine, amine-terminated polyethers such as Jeffamine D-400 from Huntsman Chemical Company, amino ethyl piperazine, 2-methyl piperazine, 1,5-diamino-3-methyl-pentane, isophorone diamine, ethylene diamine, hexane diamine, hydrazine, piperazine, mixtures thereof and the like.

The foaming reaction may be conducted in the presence of a filler, which reduces overall cost and may improve flame resistance, load bearing and other physical properties to the product. The filler may constitute up to about 50 percent, of the total weight of the polyurethane foam formulation. Suitable fillers include talc, mica, montmorillonite, marble, barium sulfate (barytes), milled glass granite, milled glass, calcium carbonate, aluminum trihydrate, carbon, aramid, silica, silica-alumina, zirconia, talc, bentonite, antimony trioxide, kaolin, coal based fly ash and boron nitride.

The amount of polyisocyanate that is used to make resilient flexible foam typically is sufficient to provide an isocyanate index of from 0.6 to 1.20, although wider ranges can be used in special cases. A preferred range is from 0.7 to 1.05 and a more preferred range is from 0.75 to 1.05.

Resilient, flexible foam can be made in accordance with the invention in a slabstock process or in a molding process. Slabstock foam is formed as a large bun which is cut into the required shape and size for use. Molding processes can be either so-called hot molding process or a cold molding process. An integral skin can be form onto the surface of the foam in the mold. A film, fabric, leather or other coverstock can be inserted into the mold prior to introducing the foam formulation, to produce a foam that has a desirable show surface.

Polyurethane foam formulations that contain a mixture of ethylene oxide-capped polypropylene oxides in accordance with the invention have been found to process well, especially in high water formulations as described before. Good processing herein refers to the ability of a foam formulation to consistently produce good quality foam in an industrial setting. Good processing is indicated by consistently uniform cell structure, complete mold filling, consistently good surface appearance, consistent foam density and consistency in foam physical properties as the foam is produced over time. The foam formulation tolerates small changes in operating temperatures, catalyst levels and other process conditions which often cause significant product inconsistencies in other high water foam formulations.

It is often preferred to crush the foam to open the cells. A high open cell content (at least 25% by number, preferably at least 50%) is usually beneficial for foams that are used in noise and vibration absorption applications.

Resilient, flexible foam is characterized in having a resiliency, as determined using the ASTM D-3574 ball rebound test, which measures the height a ball rebounds from the surface of the foam when dropped under specified conditions. Under the ASTM test, the foam exhibits a resiliency of at least 40%, especially at least 50%. The foam advantageously also has a density in the range of 2.0 to 10 pounds/cubic foot (pcf)

(32-160 kg/m³), preferably from 2.0 to 2.65 pounds/cubic foot (32-42 kg/m³). Density is conveniently measured according to ASTM D 3574

The foams are particularly useful for noise and vibration-absorbing applications such as, for example automotive seating and other automotive interior parts such as dashboards, headliners, instrument panels and trim. The foams preferably absorb at least 10% of sound pressure on the petite cabin test described below, over a frequency range from 1000 to 4000 Hz.

COMPARATIVE SAMPLE A

A formulated polyol mixture is prepared by mixing the following ingredients:

| Component | Parts by Weight |
|---|---|
| Ethylene oxide-capped polypropylene oxide diol[1] | 30 |
| Ethylene oxide-capped polypropylene oxide triol[2] | 60 |
| Water | 4.2 |
| Amine catalyst mixture | 1.25 |
| Cell opener | 3 |
| Silicone surfactant | 0.3 |
| Colorant | 0.25 |

[1]2000 hydroxyl equivalent weight, 15% ethylene oxide cap, 75-80% primary hydroxyl groups.
[2]2000 hydroxyl equivalent weight, 17% ethylene oxide cap, 75-85% primary hydroxyl groups.

This formulated polyol is reacted with a polymeric MDI having an isocyanate content of about 32% by weight on a high pressure impingement mixing machine equipped with a 100 cm×100 cm×2.5 cm test mold heated to 40-60° C. The isocyanate index is 0.8 in each case.

The resulting foam has a core density of 44.4 kg/m³. When this formulation is modified to increase the water level to 5%, in an attempt to produce foams having densities of 40 kg/m³ or lower, it becomes difficult to process consistently into good quality foam. The foam begins to exhibit significant surface defects, or poor cell structure.

EXAMPLES 1-4

Molded foams Examples 1-4 are made in the same general manner as Comparative Sample A, at a 0.8 isocyanate index, from the following formulated polyol formulations:

| | Parts by Weight | | | |
|---|---|---|---|---|
| Component | Ex. 1 | Ex. 2 | Ex. 3 | Ex. 4 |
| Ethylene oxide-capped polypropylene oxide diol[1] | 5 | 45 | 10 | 80 |
| Ethylene oxide-capped polypropylene oxide triol A[2] | 80 | 45 | 80 | 5 |
| Ethylene oxide-capped polypropylene oxide triol B3 | 7.6 | 3.8 | 3.8 | 7.6 |
| Ethylene-oxide capped polypropylene octol[3] | 2.4 | 1.2 | 1.2 | 2.4 |
| Water | 5 | 5 | 5 | 5 |
| Amine catalyst mixture | 1.25 | 1.25 | 1.25 | 1.25 |
| Cell opener | 3 | 3 | 3 | 3 |
| Silicone surfactant | 0.3 | 0.3 | 0.3 | 0.3 |
| Colorant | 0.25 | 0.25 | 0.25 | 0.25 |

[1]Same diol as described for Comparative Sample A.
[2]Same triol as described for Comparative Sample A.
[3]1800 equivalent weight, 17% ethylene oxide-capped polyols having 75-85% primary hydroxyl groups, made as a mixture by alkoxylating a mixture of trifunctional and 8-functional initiators.

All four of these formulations process very well to consistently make foams having consistent physical properties, uniform cell structure and few if any surface defects.

The foams are crushed to open the cells, and core density is measured according o ASTM D3574. Tensile, tear strength, elongation and 50% compression set are measured according to ASTM D3574. The ability of the foam to absorb sound is evaluated via the Renault Petit Cabine test at 500, 1000, 2000 and 4000 Hz, which measures insertion loss. A concrete base with nine loudspeakers forms an excitation chamber which is separated from a receiving chamber by a 0.8 mm steel sheet which accommodates a 700×700×20 mm test sample. The receiving chamber is a semi-anechoic hood which prevents reflection of the transmitted sound energy. The hood is equipped with a microphone. The loudspeakers are excited with a filtered white noise to produce a sound pressure level of about 80 dB at each of the test frequencies. The sound pressure in the receiving chamber is measured with only the sheet metal divider in place. Then the sound pressure is measured again with the test sample and a 5 kg/m² heavy level in place. The difference in sound pressure is the insertion loss. Greater insertion losses indicate better sound absorption.

Results are as indicated in Table 1 below. For comparison, the results of physical property testing of Comparative Sample A are also indicated.

TABLE 1

| Property | Ex. 1 | Ex. 2 | Ex. 3 | Ex. 4 | A* |
|---|---|---|---|---|---|
| Core density, kg/m³ | 38.2 | 39.8 | ~40 | 38.9 | 44.4 |
| Tensile strength, kPa | 151 | 166 | 178 | 150 | 106 |
| Elongation, % | 100 | 106 | 96 | 103 | 102 |
| 50% Compression set, % | 19.9 | 20.4 | 19.5 | 24.7 | 22.2 |
| Tear strength, N | 214 | 240 | 220 | 229 | 280 |
| Absorbance (petit cabine) | | | | | |
| 500 Hz | −4.7 | −5.1 | −4.5 | −3.3 | ND |
| 1000 Hz | 16.8 | 16.2 | 14.4 | 13.7 | ND |
| 2000 Hz | 26.2 | 27.4 | 26.9 | 21.8 | ND |
| 4000 Hz | 37.2 | 41.7 | 39.5 | 32.2 | ND |

The foam examples of the invention have physical (tensile, tear, elongation and compression set) properties very similar to those of Comparative Sample A, even though the foam densities are reduced by 10% or more. The foams of the invention also process easily, which is very surprising. Repeatedly-made foam samples all exhibit good cell structure and good mold fill. The foam examples of the invention also perform well in absorbing sound over the frequency range of from 1000 to 4000 Hz.

What is claimed is:

1. A process for preparing a polyurethane, comprising blending a mixture of ethylene oxide-capped polypropylene oxides with a polyisocyanate and subjecting the resulting blend to conditions sufficient to cure the blend to form a resilient, flexible polyurethane foam wherein the mixture of ethylene oxide-capped polypropylene oxides each has a hydroxyl equivalent weight of from 1700 to 2200 and containing at least 70% primary hydroxyl groups, wherein from 5 to 80% by weight of the ethylene oxide-capped polypropylene oxides are nominally difunctional, from 1 to 5% by weight of the ethylene oxide-capped polypropylene oxides have a nominal functionality from 6 to 8, and from 10 to 94.5% by weight of the ethylene oxide-capped polypropylene oxides, are nominally trifunctional.

2. A process for preparing a resilient, flexible polyurethane foam comprising blending a mixture of ethylene oxide-capped polypropylene oxides with a polyisocyanate in the presence of from 4 to 7 parts by weight of water per 100 parts by weight of the ethylene oxide-capped polypropylene oxides and subjecting the resulting blend to conditions sufficient to cure the blend to form a resilient, flexible polyurethane foam wherein the mixture of ethylene oxide-capped polypropylene oxides each has a hydroxyl equivalent weight of from 1700 to 2200 and containing at least 70% primary hydroxyl groups, wherein from 5 to 80% by weight of the ethylene oxide-capped polypropylene oxides are nominally difunctional, from 1 to 5% by weight of the ethylene oxide-capped polypropylene oxides have a nominal functionality from 6 to 8, and from 10 to 94.5% by weight of the ethylene oxide-capped polypropylene oxides, are nominally trifunctional.

3. The process of claim 2 wherein the resilient, flexible polyurethane foam has a density of from 36 to 42 kg/m$^3$.

* * * * *